March 17, 1959 J. H. MERCIER 2,877,801
CLAMPING MEANS FOR BLADDER OF PRESSURE ACCUMULATOR
Filed Nov. 2, 1954 2 Sheets-Sheet 2
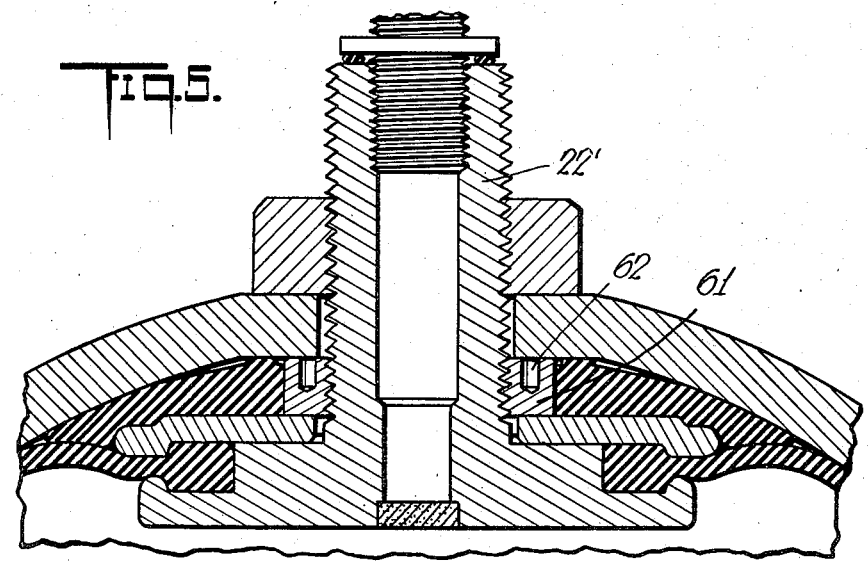
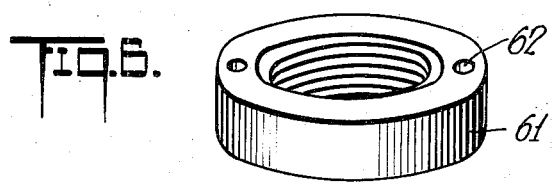
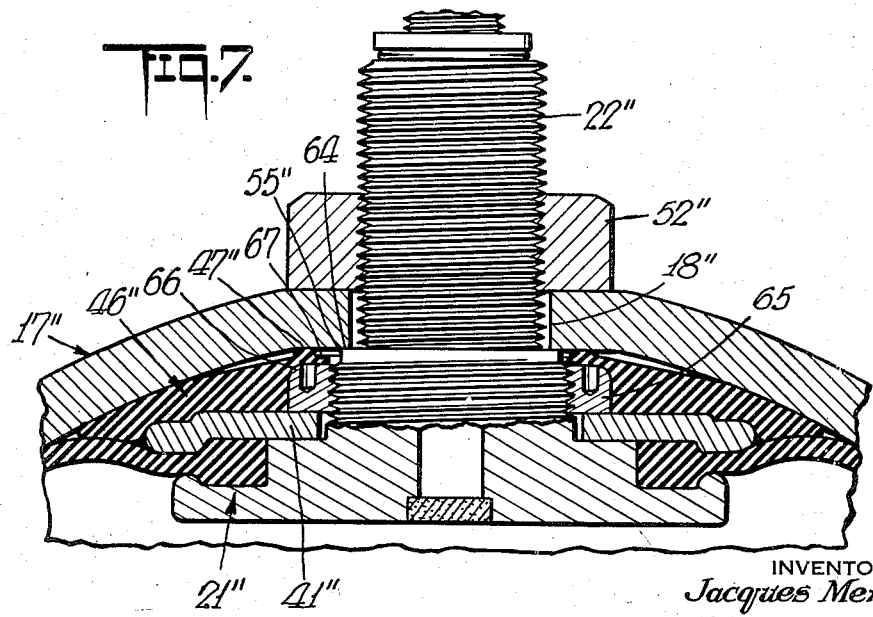
INVENTOR
Jacques Mercier
BY
Dean Fairbank + Hirsch
ATTORNEYS

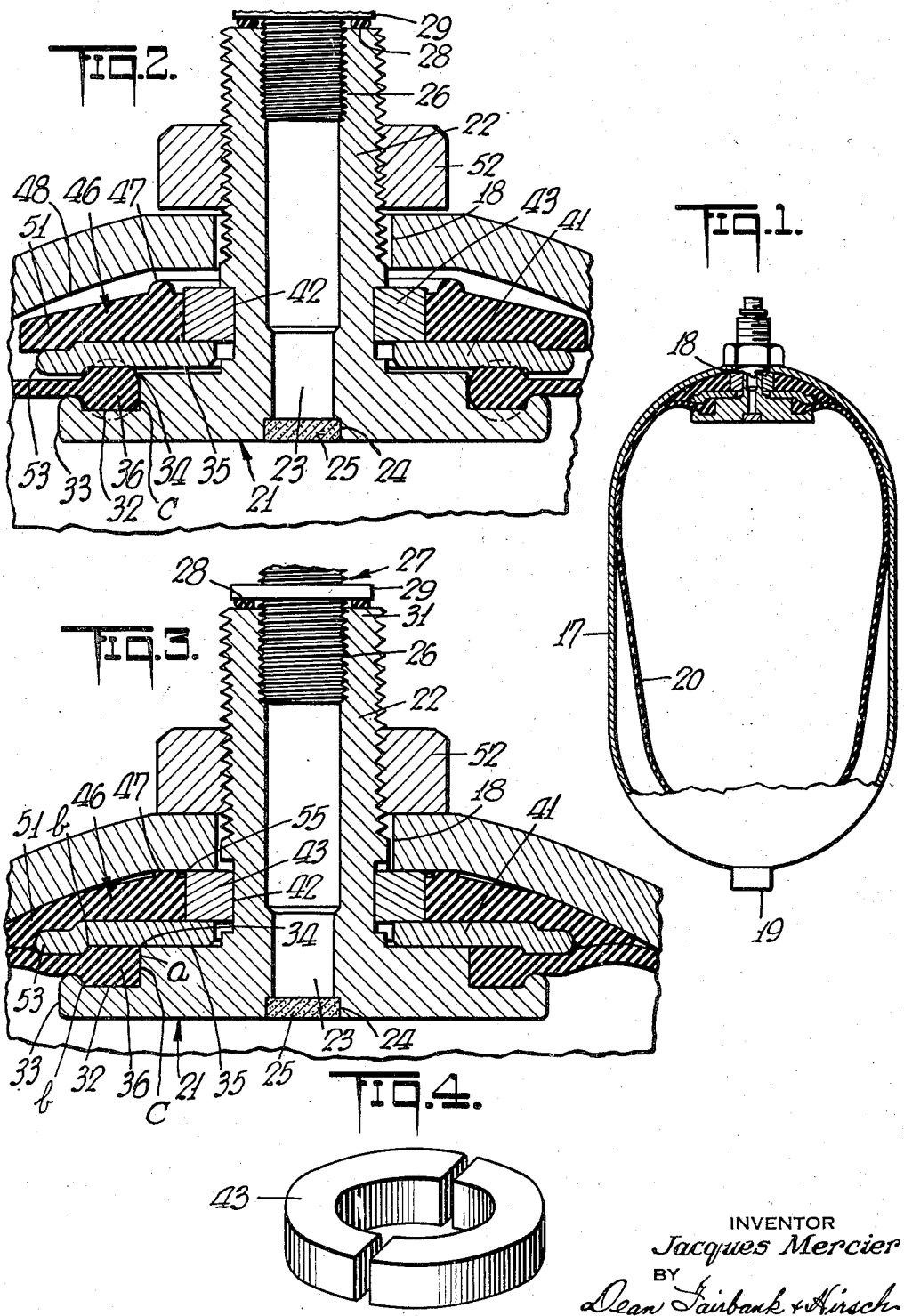

United States Patent Office 2,877,801
Patented Mar. 17, 1959

2,877,801

CLAMPING MEANS FOR BLADDER OF PRESSURE ACCUMULATOR

Jacques H. Mercier, New York, N. Y., assignor to Greer Hydraulics, Inc., a corporation of New York Application November 2, 1954, Serial No. 466,307

9 Claims. (Cl. 138—30)

It is among the objects of the invention to provide clamping means for the bladder of a pressure accumulator, which clamping means has but few parts that may readily be fabricated at low cost and which is strong and durable and not likely to become deranged and which may readily be assembled, securely to clamp the periphery of the mouth of the bladder without likelihood of injury thereof so that when the clamping means is affixed to the gas inlet port of the accumulator shell a dependable seal will be provided to prevent leakage between the gas and liquid chambers of the accumulator defined by the bladder and also to prevent leakage from the interior of the accumulator and which clamping means may readily be disassembled for removal of a defective bladder.

According to the invention, these objects are accomplished by the arrangement and combination of elements hereinafter described and particularly recited in the claims.

In the accompanying drawings in which are shown one or more of various possible embodiments of the several features of the invention, Fig. 1 is a longitudinal sectional view of a pressure accumulator incorporating one embodiment of the bladder clamping means, Fig. 2 is a fragmentary detailed view on a greatly enlarged scale of the clamping means in partially assembled position, Fig. 3 is a view similar to Fig. 2 of the clamping means in fully assembled position, Fig. 4 is a perspective view of the locking segments, Fig. 5 is a view similar to Fig. 3 of another embodiment of the clamping means, Fig. 6 is a perspective view of a locking nut, and Fig. 7 is a view similar to Fig. 3 of still another embodiment of the clamping means.

Referring now to the drawings, the pressure accumulator shown in Fig. 1 comprises a shell or container 17 preferably substantially cylindrical as shown and having axially aligned ports 18 and 19 at each end. The invention resides in the means to retain a bladder 20 in position in the shell. As clearly shown in Figs. 2 and 3, such means comprises a circular plate or disc 21 which has a stem 22 rising therefrom and preferably formed integral therewith. Extending through the stem and the disc is an axial bore 23, which is of enlarged diameter at its inner end defining a cavity 24 in the undersurface of the disc 21, which is filled with a mass or plug of porous material 25, such as a sintered metal such as bronze, for example.

The outer end of bore 23 is desirably internally threaded as at 26 to receive the correspondingly threaded end of an air valve 27, which may be a conventional Schrader valve. Desirably, a resilient seal ring 28, such as an O ring, encompasses the end of the valve 21 and is compressed between the flange 29 of the valve and the end 31 of the stem to prevent leakage of air.

Positioned in juxtaposition to the disc 21 is a circular clamp plate 41 desirably of diameter greater than that of the disc 21 and having a central opening through which the stem 22 extends to center the plate with respect to the disc 21. The disc 21 and the clamp plate 41 are conformed so that when they are in juxtaposition, their opposed surfaces will engage near their inner peripheries and they will define an annular cavity C near their outer peripheries, said outer peripheries being spaced to define an annular opening leading into the annular cavity.

To this end, the disc 21 is desirably provided with an annular groove 32 in its upper surface adjacent its periphery 33. The portion of the upper surface of disc 21 between the inner edge 34 of groove 32 and the root end of stem 22 defines a clamping surface 35 which, as shown in Fig. 2, lies in a plane above that of the periphery of the disc.

Adapted to be positioned in groove 32 is the enlarged bead 36 at the mouth of the bladder 20 of the accumulator. The bladder is desirably substantially conical in contour and the mouth thereof is of such diameter that when the disc 21 is positioned therein, as shown in Figs. 2 and 3, the bead 36 will be aligned with groove 32.

Means are provided releasably to retain the plate 41 against the disc 21 so that the bead 36 will be compressed therebetween substantially filling the annular cavity C defined by the groove 32 and the opposed surface of plate 41.

To this end, as shown in Fig. 2, the stem 22, adjacent its root end, is provided with an annular groove 42 substantially rectangular in cross section. Movable into groove 42 is a plurality of arcuate locking segments 43, illustratively two in number, each occupying approximately 180 degrees of arc. The segments are of height such that when they are positioned in groove 42 with the bottom of the segments resting on the top of plate 41 adjacent its inner periphery, by reason of the resilience of the compressed bead 36 the tops of the segments will be urged against the upper portion of the groove. Although the bottom of the plate 41 will be slightly spaced from the clamping surface 35 of the disc 21 by reason of the resilience of the partially compressed bead, the bead 36 will still be so tightly clamped between the disc 21 and plate 41 that it will be securely retained in position in the annular cavity defined by groove 32 and the clamp plate 41.

Encompassing the segments 43 is a spacer member 46, desirably a disc of resilient material such as natural or synthetic rubber, which preferably is of the same type as the bladder. The spacer member 46 desirably has an outstanding annular bead 47 adjacent its inner periphery which rises above the top of the segments. The upper surface of the spacer member is conformed so that it has a curvature substantially complementary to the curvature of the inner surface 48 of the shell. The periphery 51 of the spacer member is so conformed that when the stem 22 of the clamping means is inserted through the port 18 of the shell and the top of the segments 43 is drawn against the shell, as shown in Fig. 3, by means of a nut 52 screwed on the threaded end of the stem protruding beyond the shell, the periphery 51 of the spacer member 46 will be compressed between the shell and the clamp plate 41 and will extend beyond the rounded periphery 53 of the plate 41. In addition, the bead 47 will also be compressed for the purpose hereinafter set forth and the plate 41 will be moved against the disc 21 further compressing the bead 36 so that it will fill the annular cavity. However, by reason of the spacing between the outer peripheries of the disc 21 and clamp plate 41, the portion of the bladder wall extending laterally outward from the bead 36 will be substantially uncompressed.

With the construction above described, when the assembled accumulator is charged with gas and liquid under pressure, as the bead 36 is compressed in annular cavity C and at the joint 34 is subjected to atmospheric pressure on its side *a* and to the high pressure of the air in bladder 20 and the liquid in the shell 17 (which are equal) on its side *b*, the resultant differential in pressure will cause the bead 36 to wedge in joint 34 acting in the manner of a conventional O ring to provide a dependable seal at such joint.

As the bead 47 is compressed adjacent the joint 55 defined between the shell and the retaining ring 43, and one side of said bead is subjected to atmospheric pressure and the other to the high pressure of the liquid in the shell, which will pass between the shell and the compressed periphery of the spacer member 46, due to the differential between the pressure on opposed sides of the bead 47, it will be forced into the joint 55 to provide a dependable seal.

When the bladder 20 expands in conventional manner to force liquid from the container, as the portion thereof adjacent the periphery of plate 41 moves against the shell wall, it will abut against the compressed resilient periphery 51 of the spacer member 46 which will prevent extrusion of the bladder between the plate 41 and the shell. When the bladder is compressed upon initial charging of the container with liquid, in the event it is forced against the end of the air inlet bore 23, by reason of the porous plug 25, it will not be extruded.

In the embodiment shown in Fig. 5 which is similar to the embodiment shown in Figs. 2, 3 corresponding parts have the same reference numerals primed.

In this embodiment, the stem 22' is externally threaded along substantially its entire length and in place of the segments 43 and groove 42 of the embodiment of Figs. 2 and 3, a nut 61 is provided which serves the same purpose and which may be tightened by a suitable spanner wrench coacting with recesses 62 in the nut 61.

In the embodiment shown in Fig. 7 parts corresponding to those of Figs. 2, 3 have the same reference numerals double primed.

In Fig. 7, the stem 22" is of enlarged diameter adjacent its root end defining an annular shoulder 64 which will be retained against the periphery of port 18" of the shell when the nut 52" is tightened. The portion of stem 22" between shoulder 64 and the root end of the stem is threaded to receive a nut 65 which retains clamp plates 41" against disc 21". The nut is of such dimensions that when it is completely tightened, its top surface 66 will be spaced from shoulder 64 and the spacer member 46" is of reduced thickness adjacent its inner periphery so that the portion 67 thereof will rest on the top surface of nut 65, with bead 47" being adjacent the joint 55" between shell 11 and shoulder 64.

As the operation of the embodiments shown in Figs. 5 and 7 is apparent in view of the detailed explanation of the embodiment shown in Figs. 2 and 3, no further explanation is believed necessary.

With the construction above described, secure clamping of a bladder is provided without likelihood of leakage of liquid or gas from the accumulator or leakage between the liquid and gas chamber of the accumulator defined by the bladder. In the event of bladder failure, which necessitates replacement, as the bladder is releasably retained by the clamping means, it may readily be removed and as the same clamping means are available for reuse, the cost of bladder replacement is considerably less than it would be if the clamping means including the disc and stem were permanently mounted to the bladder.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described for use with a pressure accumulator of the type having a rigid container with a port and a deformable bladder in said container having a mouth with a thickened portion around its periphery, said equipment comprising means to secure the bladder in the container, said means comprising a disc having a stem rising therefrom and adapted to extend through such port, a clamp plate having a central opening through which said stem extends, means to retain said clamp plate adjacent its inner periphery against the opposed surface of the disc, the opposed surfaces of said disc and said clamp plate near their outer peripheries being conformed to define an annular cavity therebetween, the outer peripheries of said disc and said clamp plate being spaced to define an annular opening leading into the cavity, whereby when the thickened portion of the bladder is compressed to fill said annular cavity the portion of the bladder extending outward from said thickened portion through said annular opening will be substantially uncompressed, a spacer disc of resilient material encompassing said stem and in engagement with the surface of the clamp plate remote from the disc, said spacer disc being positioned to be compressed between the clamp plate and the container wall.

2. The combination set forth in claim 1 in which the retaining means for the clamp plate encompasses the stem and the surface of the retaining means remote from the root end of the stem defines a shoulder, whereby with the disc positioned in the container, when the stem is moved outwardly from the port, the shoulder will abut against the mouth of the port to prevent excessive compression of the resilient spacer disc.

3. The combination set forth in claim 1 in which said stem is of reduced diameter at its outer end defining an annular shoulder, the portion of said stem between the shoulder and the root end of the stem being threaded, the retaining means comprises a nut screwed on said threaded portion, the thickness of said nut being less than the length of said threaded portion, the spacer disc of resilient material has central opening through which said nut extends, said spacer disc being of reduced thickness at its inner periphery defining a flange at its top portion adapted to extend over the top surface of the nut.

4. The combination set forth in claim 3 in which the thickness of said flange is less than the distance between the shoulder and the top surface of said nut when the latter is tightened and an annular upstanding bead is formed integral with the spacer disc adjacent its inner periphery, said bead being of height such that when the shoulder is moved against the mouth of said port, said bead will be partially compressed to form a seal between the shoulder and the mouth of said port.

5. The combination set forth in claim 1 in which the retaining means for the clamp plate encompasses the stem and the surface of the retaining means remote from the root end of the stem defines a shoulder, the spacer disc of resilient material has a central opening through which said retaining means extends, the thickness of said spacer disc at its inner periphery being less than that of said retaining means, whereby with the disc positioned in said container when the stem is moved outwardly from the port, the shoulder will abut against the mouth of the port to prevent excessive compression of said resilient spacer disc.

6. The combination set forth in claim 5 in which the stem has an annular peripheral groove adjacent its root end and the retaining means comprises a locking member positioned in said groove and extending laterally outward therefrom over the inner periphery of said clamp plate to force the latter against said disc.

7. The combination set forth in claim 6 in which the locking member comprises a pair of annular segments, each substantially 180 degrees of arc.

8. The combination set forth in claim 5 in which the diameter of the spacer disc is such that when it is compressed between the clamp plate and the container, its outer periphery will extend beyond the outer periphery of said clamp plate.

9. The combination set forth in claim 5 in which an annular upstanding bead is formed integral with the spacer disc adjacent its inner periphery, said bead being of height such that when the shoulder is moved against the mouth of said port, said bead will be partially compressed to form a seal between the shoulder and the mouth of said port.

References Cited in the file of this patent

UNITED STATES PATENTS

| | | |
|---|---|---|
| Re. 22,653 | White | June 26, 1945 |
| 2,390,320 | Overbeke | Dec. 4, 1945 |